United States Patent
Carriere

[11] 3,876,093
[45] Apr. 8, 1975

[54] BALE HANDLER
[75] Inventor: Russell F. Carriere, Baraga, Mich.
[73] Assignee: Pettibone Corporation, Chicago, Ill.
[22] Filed: Mar. 9, 1973
[21] Appl. No.: 339,899

[52] U.S. Cl............... 214/147 R; 294/88; 294/107
[51] Int. Cl. ............................................. B66c 1/00
[58] Field of Search................... 294/88, 98, 107; 214/147 R, 147 G

[56] References Cited
UNITED STATES PATENTS

| | | | |
|---|---|---|---|
| 2,474,374 | 6/1949 | Shattuck | 214/147 G |
| 2,734,646 | 2/1956 | Stimpson | 214/147 R |
| 3,319,813 | 5/1967 | Beyea | 214/147 G X |
| 3,334,762 | 8/1967 | Davis | 294/88 X |
| 3,362,550 | 1/1968 | Kappler | 214/147 G |
| 3,420,564 | 1/1969 | Jensen | 294/88 X |

Primary Examiner—Evon C. Blunk
Assistant Examiner—Jeffrey V. Nase
Attorney, Agent, or Firm—Darbo, Robertson & Vandenburgh

[57] ABSTRACT

A group of bales which may comprise one layer in a stack can be handled simultaneously by means of a panel of claws, preferably carried at the end of a boom of a reaching-loader vehicle. The panel of claws includes a frame carrying a multitude of shafts each having fixed thereon a plurality of claw-shaped tines. All of the shafts can be oscillated by hydraulic motor means to swing the tines point first through a continuation of the arc along which they extend to enter into and anchor themselves in a bale such as hay or straw. The frame can then be raised with its entire layer of bales, carried about by the vehicle, set down on or to start a new stack; the shafts then being oscillated in reverse direction to withdraw the tines, so that upon moving the claw panel the bales will be left where they were placed.

2 Claims, 5 Drawing Figures

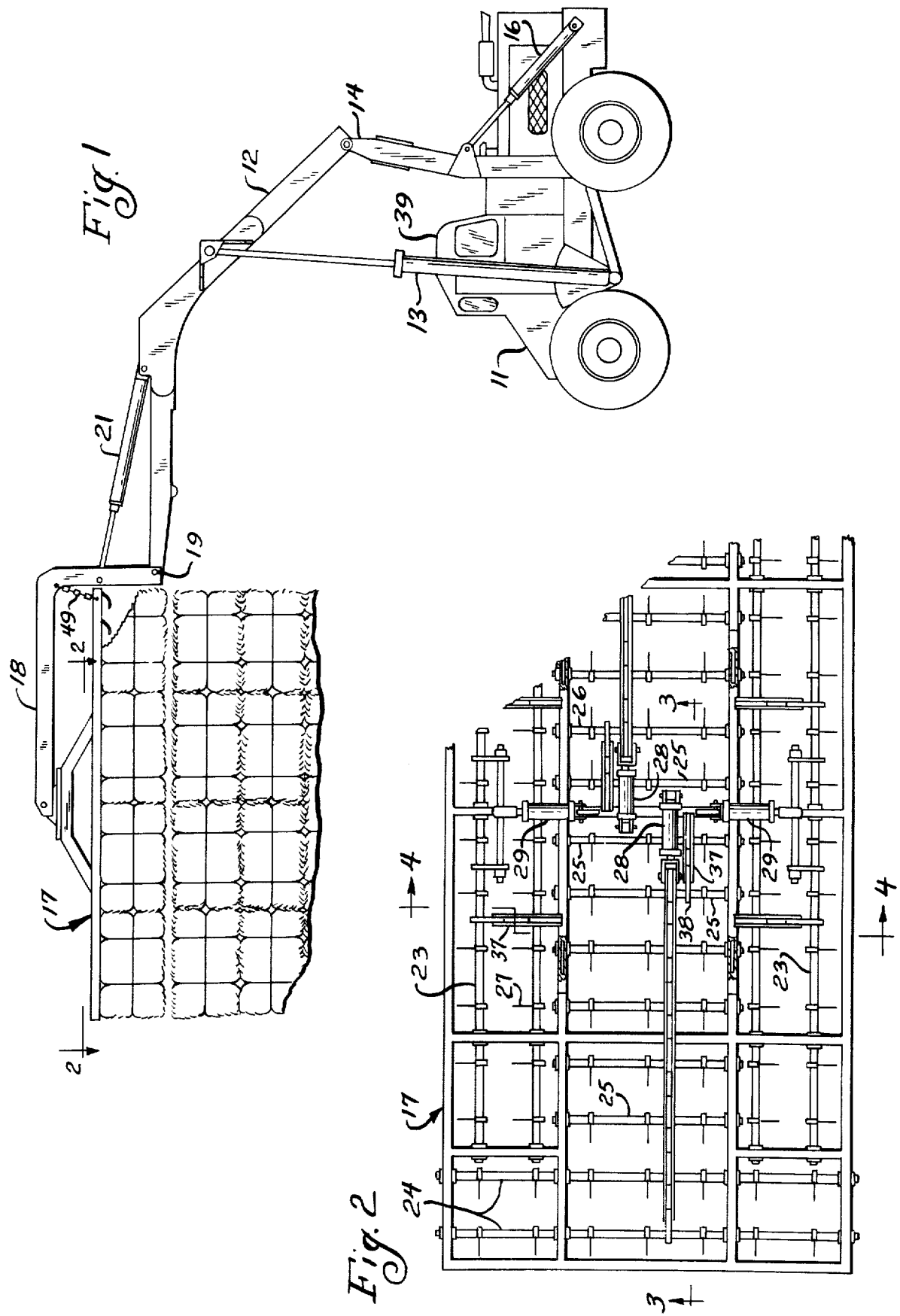

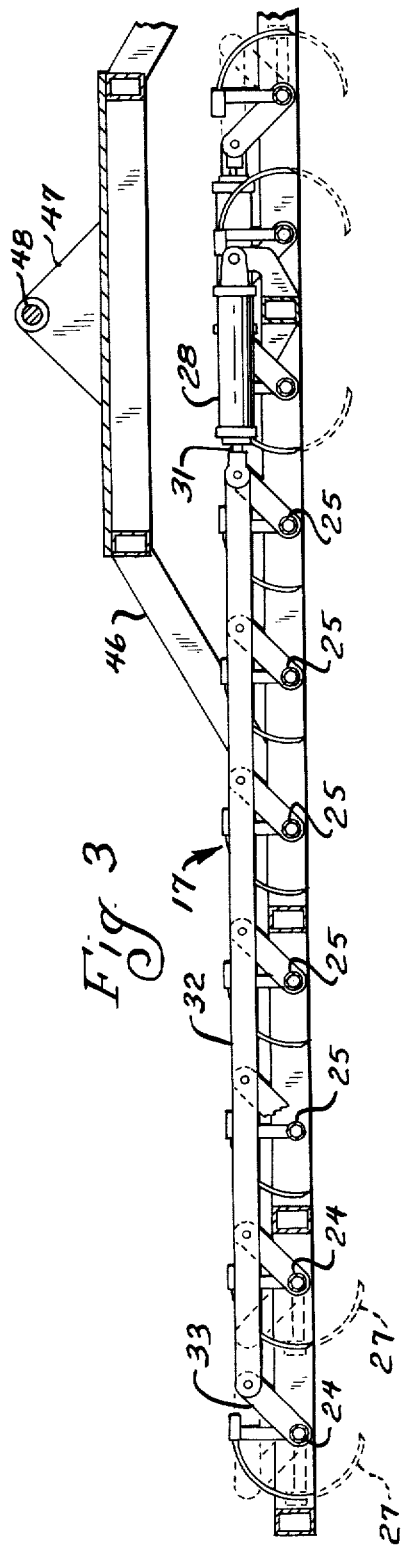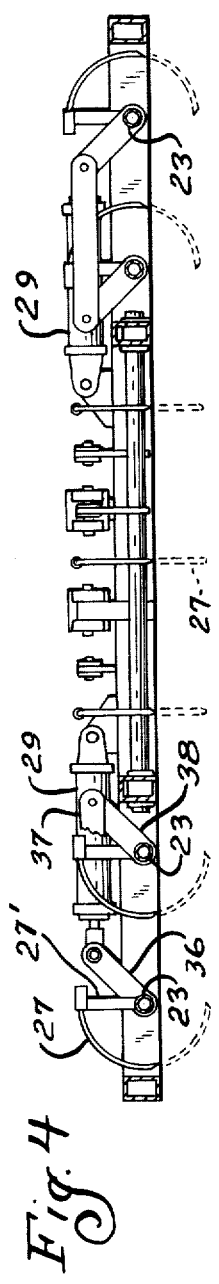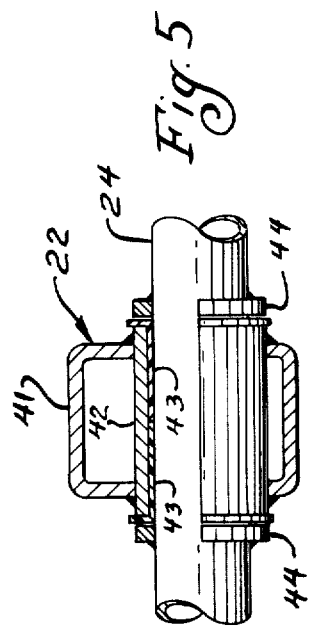

3,876,093

BALE HANDLER

INTRODUCTION

The invention of which the present disclosure is offered for public dissemination in the event adequate patent protection is available relates to the problem of handling large quantities of bales for stacking them for storage or loading them for transport.

The problem which this invention solves has been most severe in connection with relatively lightweight bales such as straw or hay. For such bales, the use of fork-lift equipment has been relatively uneconomical because it made such poor use of the available lifting power. It was not practical to simply lengthen the forks to a length such that their load would approximate the lifting capacity which loader vehicles commonly have, because such long forks would too often not be properly registered with the bottoms of the bales they were intended to lift after they had penetrated beyond the first bale or so. Furthermore, with the present invention it has been found to be extremely advantageous to be able to handle a large number of bales in a single layer. For example, if the claw panel approximately corresponds to the dimensions of the bed of a truck to be used for haulage, the truck can be loaded with minimum time, and minimum maneuvering of the loader, by filling the load space with successive layers each substantially filling the space horizontally.

According to the present invention this problem is solved, with exceptionally satisfactory results, by providing a claw panel, to be carried at the end of a boom, the claw panel having a large number of arcuate tines arranged at reasonably close intervals throughout its area, each oscillatable along its arc or continuation thereof. When the claws have been swung from a retracted position so that they move tip-first and enter into the bale and swing far enough so that the leading portion of each tine has at least swung far enough to be nearly horizontal, the bales are firmly secured to the frame by the claws and the entire layer may be lifted, moved about, set down in the desired new location, and released by retracting tines or claws.

Objects and advantages of the invention may be more apparent from the following description and from the drawings.

DESIGNATION OF FIGURES

FIG. 1 is a side view showing a loader vehicle equipped with the present invention being used for moving a layer of bales to or from a high stack of bales.

FIG. 2 is a view looking down on the top of the claw panel, being taken approximately on the line 2—2 of FIG. 1.

FIG. 3 is a vertical longitudinal sectional view through a portion of the claw panel, being taken approximately on line 3—3 of FIG. 2.

FIG. 4 is a transverse vertical sectional view through the claw panel, being taken approximately along the line 4—4 of FIG. 2.

FIG. 5 is a view partly in section through a preferred form of bearing for the oscillatable tine-bearing shafts of FIGS. 1 to 4.

GENERAL DESCRIPTION OF INVENTION

The invention contemplates the use of some sort of a loader vehicle 11 having a boom 12 which may be raised and lowered by hydraulic cylinder means 13. Preferably the loader is of a reaching type, as by having an upstanding link 14 pivotable between the position shown in FIG. 1 and a more rearward position under control of a reaching cylinder 16. According to the present invention, a claw panel 17 is carried by the boom through a pivoted extender 18 pivoted to the boom at 19 and controlled through hydraulic cylinder means 21.

THE CLAW PANEL OF THE PRESENT INVENTION

The heart of the present invention is the claw panel 17. As seen in FIG. 2, this panel includes a frame structure 22 in which are mounted for pivotal action a large number of shafts 23, 24, 25 and 26. Each of these shafts carries a plurality of tines 27 of arcuate shape, the shank of each tine being secured to an arm 27' rigid with the shaft by which it is carried so that as the shaft is oscillated, the tine is oscillated along an arcuate path in which it lies.

All of the shafts 23 to 26 are controlled by one or another of the four hydraulic cylinders 28 and 29, all of which are located somewhat centrally of the panel 17. Thus as seen in FIG. 3 one of the cylinders 28 has its piston rod 31 connected to an elongate link bar 32 which is pivoted to several crank arms 33, each of which is fixed to one of the shafts 24 or 25. Thus when the cylinder 28 is actuated by the supply of pressure fluid to one end thereof or the other, it actuates link bar 32, or the crank arms 33 associated with that link bar, and all of their shafts 24 and 25, thereby swinging the tines 27 along their arcuate paths of movement. Similarly, it is clear from FIG. 4 that when a cylinder 29 is actuated it actuates a crank arm 36 on a shaft 23, for actuating the tines 27 on that shaft. Actually, it actuates both of the adjacent shafts 23, the second shaft being coupled to the first shaft by a link 37, and a pair of crank arms 38 each on one of the shafts 23. Some parts of this coupling linkage not shown in FIG. 4 can be seen in FIG. 2. In similar manner, as seen in FIG. 2, each of the most centrally located shafts 25, lying under one of the cylinders 28, is operated by that cylinder by virtue of being coupled to the next shaft 25 as just described with respect to two shafts 23, i.e. by a coupling link 37 and crank arms 38.

All of the hydraulic cylinders mentioned, including all four of cylinders 28 and 29, are double-acting cylinders. Thus each end of each cylinder is connected to a hydraulic line, the two lines for each cylinder being controlled by a reversing valve in cab 39. This hydraulic system is sufficiently standard to be understood from the showing of the cylinders and therefore is not illustrated. All four of the cylinders 28 and 29 are connected to the same two lines extending along the extender 18, boom 12 and link 14 to the vehicle, high-pressure hoses being used at at least the points where pivoting occurs. Thus a single valve handle accessible to the operator in cab 39 will actuate all four cylinders 28 and 29, one position of the valve moving all of the tines 27 in the seizing direction and another position of the valve moving all of the tines in the releasing direction. There may be a neutral closed position of the valve in which the tines are hydraulically locked in whatever position they are then in.

FIG. 5 illustrates a simple bearing structure which is suitable for the shafts 23, 24 and 25. A frame member 41 of frame 22 has a sleeve 42 extending through it and tack welded in place. Two half bearing bushings 43 may be inserted into the sleeve 42 from its two ends. A shaft, such as shaft 24, is passed through all such bearings for that shaft, and through sets of end thrust rings 44. Inasmuch as disassembly is extremely unlikely, the end thrust rings 44 may be tack welded to the shafts after assembly, as shown.

All of the tines 27 and their shafts are so arranged that the tines move toward the central portion of clawpanel 17 as they move from their retracted positions into the bales (or to their seizing positions). This is especially important as to the tines located along the periphery of panel 17 so that no bale can slip outwardly off of the tines. Slipping off of the tines in the opposite direction is prevented by the adjacent bales, the layer being continuous to the far edge where the tines again point inwardly.

Panel 17 may include or be carried by a yoke structure 46 including a pair of spaced hanger plates 47, which with shaft 48 hang the claw-panel 17 from extender 18. This hanging is of typical nature so that the extender 18 does not have to be moved to an exact angularity with respect to the top surface of a layer of bales to be picked up. In other words, if the extender 18 is at nearly the right angle, the floating relationship between the extender 18 and the claw-panel 17 will enable the claw-panel 17 to come to rest on the layer of bales to be picked up. A normally loose chain 49 can be provided for preventing the claw-panel 17 from swinging excessively.

ACHIEVEMENT

From the foregoing it is seen that a device is provided whereby a large number of bales in a layer can be picked up at one time, moved about and set down in a desired location for stacking or hauling. The structure is relatively simple and inexpensive and its operation is easily controlled.

INTENT CLAUSE

Although the preceding disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

I claim:

1. Apparatus for picking up a layer of bales by top engagement therewith including a frame structure adapted to be positioned over the layer, a plurality of horizontal shafts carried by the frame structure to be pivotable about their axes, a plurality of tines carried by the shafts, shaped generally arcuately about the shaft and movable, by turning of the shaft, along the arcuate path in which they lie, between a retracted position outside of bales which are adjacent the frame, and a seizing position lying well inside of the said bales, with a portion of the tines within the bales being sufficiently nearly horizontal to lift the bales as the frame is lifted, all tines in their seizing positions being pointed generally toward tines which in turn are pointed generally toward them so that bales on these tines, assuming solidity between them, cannot back-off pointwise from either tines, and tines intermediate oppositely pointed tines which are pointed in a direction steeply transverse to the direction of the oppositely pointed tines for more reliably retaining bales not arranged in a solid layer, and means for manipulating the frame structure to raise it through a substantial range, while keeping it substantially horizontal.

2. Apparatus for picking up a layer of bales by top engagement therewith including a frame structure adapted to be positioned over the layer, a plurality of horizontal shafts carried by the frame structure to be pivotable about their axes, a plurality of tines carried by the shafts, shaped generally arcuately about the shaft and movable, by turning of the shaft, along the arcuate path in which they lie, between a retracted position outside of bales which are adjacent the frame, and a seizing position lying well inside of the said bales, with a portion of the tines within the bales being sufficiently nearly horizontal to lift the bales as the frame is lifted, peripheral tines along four sides of the frame structure being in their seizing positions pointed generally inward, and some tines which are inwardly located from inwardly pointed tines being pointed generally in a steeply crossing direction such that inwardly pointed and crosswise pointed tines in a single bale prevent it from slipping off of either; and means for manipulating the frame structure to raise it through a substantial range, while keeping it substantially horizontal.

* * * * *